July 20, 1954  A. R. BOYLE ET AL  2,683,984
VISCOSITY MEASURING DEVICE
Filed Jan. 2, 1951  2 Sheets-Sheet 1
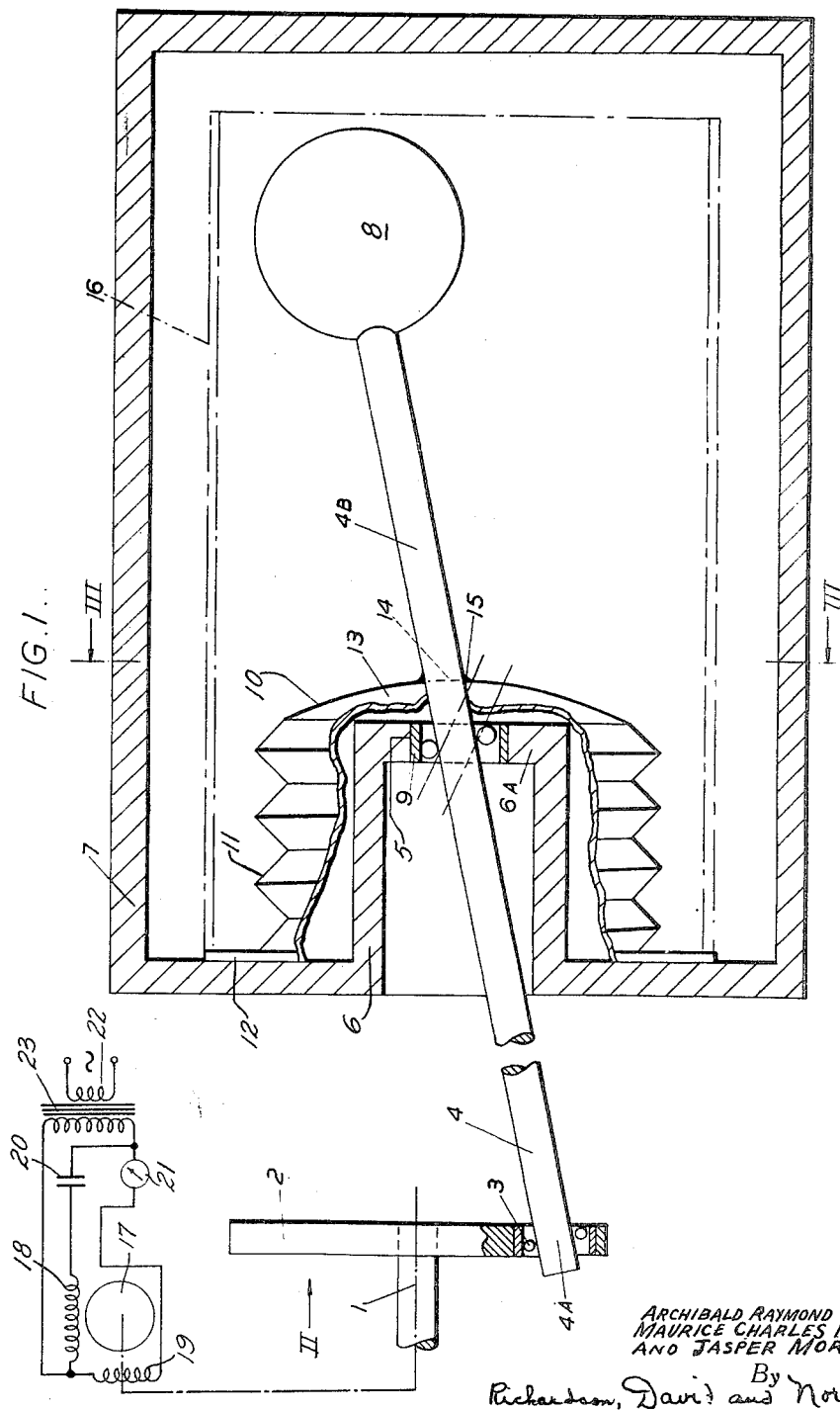
Inventor
ARCHIBALD RAYMOND BOYLE,
MAURICE CHARLES PATON HEWITT,
AND JASPER MORE
By Richardson, David and Nordon
his Attorneys.

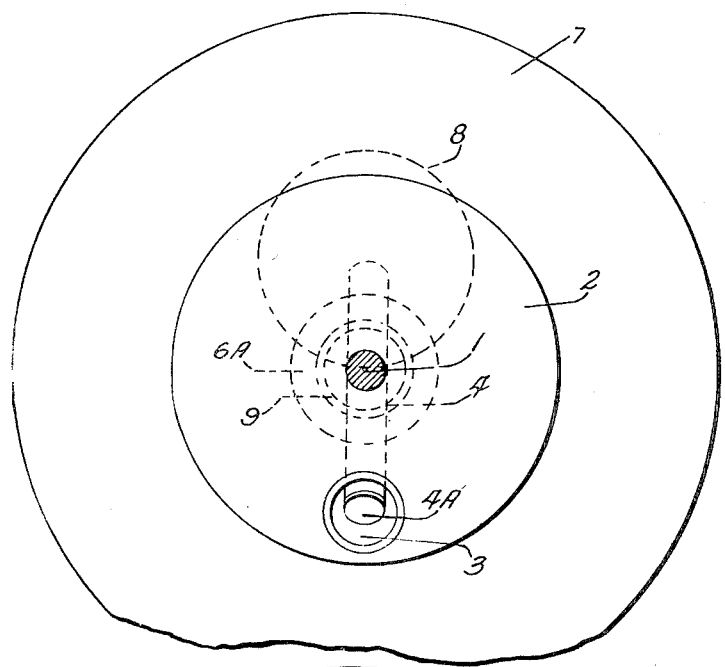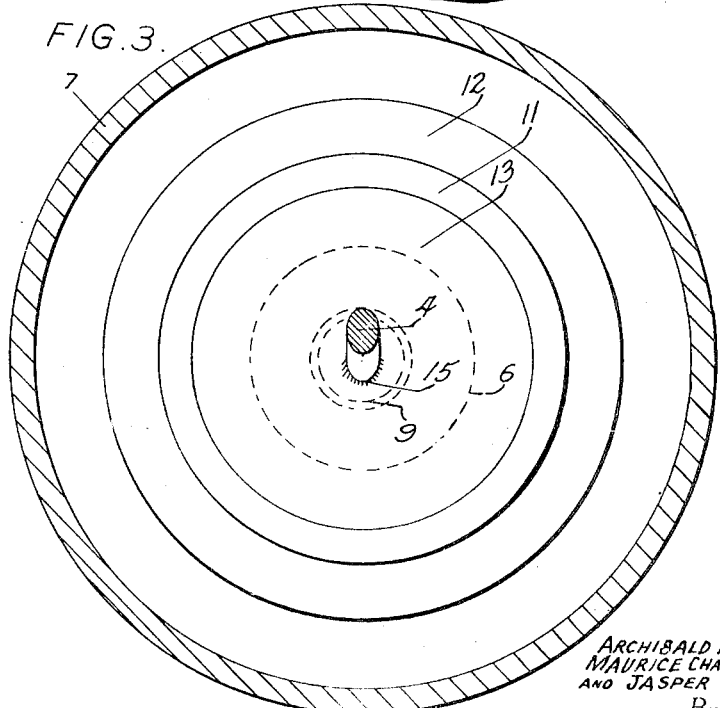

Patented July 20, 1954

2,683,984

UNITED STATES PATENT OFFICE 2,683,984

VISCOSITY MEASURING DEVICE

Archibald Raymond Boyle, Maurice Charles Paton Hewitt, and Jasper More, Glasgow, Scotland, assignors to Dobbie McInnes Limited, Glasgow, Scotland Application January 2, 1951, Serial No. 203,822

8 Claims. (Cl. 73—59)

This invention relates to a measuring device for measuring viscosity, the measuring device being of the kind having a drag member movable in a container for a liquid, semi-liquid, or like fluent material (hereinafter and in the claims referred to simply as a resistant liquid).

With the drag member moving within the container, it is very important for measurement purposes that the frictional resistance due to the mounting of the drag member should be as low as possible, and, even more important, should be constant over long periods of time. When a rotary drag member extends through an opening in a wall of the container and the opening is sealed by an ordinary pressure gland or stuffing box to prevent passage through the opening of outside air or liquid under pressure, it is impossible to obtain the requisite low and constant frictional resistance.

An object of the invention is to provide a measuring device in which the mounting for the drag member has a low and constant frictional resistance.

A further object of the invention is to provide a measuring device in which the bearing for and motion of the drag member and the seal for the container ensure low and constant frictional resistance in the bearing.

Yet another object of the invention is to provide for minimum wear of the seal for the container.

An embodiment of the invention will now be described, but merely by way of example, with reference to the accompanying drawings in which Fig. 1 is a diagrammatic view of a viscometer in which the drag member is driven by an electric motor, the current in the electric motor being measured and being a measure of the viscosity of the liquid in which the drag member is driven; Fig. 2 is an end view in the direction of arrow II (Fig. 1), and Fig. 3 is a sectional view on the line III—III of Fig. 1.

Referring to the drawings:

The viscometer includes a rotary shaft 1 having fixed thereon a crank disc 2 carrying by means of an anti-friction bearing or joint 3 the outer end 4A of a shaft 4 which projects through an opening 5 in a wall portion 6 of a cylindrical container 7 under pressure or vacuum, the inner end 4B of the shaft 4 projecting into a liquid resistant in the container. The inner end 4B of the shaft 4 has thereon a rounded body 8 shown of spherical shape, but which may be of pear shape, on which the viscous drag of the liquid mainly acts. Thus, the shaft 4 and body 8 together form a drag member. The wall portion 6 of the container 7 is in the form of a hollow cylindrical inward projection, the through opening 5 in the container wall being formed in the end wall 6A of the projection 6 and housing an annular fulcrum in the form of an anti-friction bearing 9 through which the shaft 4 extends transversely of the axis of the shaft 1. An electric motor driving the shaft 1 is as described in prior U. S. patent specification No. 2,572,693 and comprises a rotor 17, with stator windings 18 and 19 arranged in two phases at 90° electrical apart, the winding 18 having a condenser 20 in series therewith (this constituting the "condenser phase") and winding 19 having a current measuring instrument 21 in series therewith (constituting the "direct phase"). These two phases are fed from a single phase supply 22, through a transformer 23. Thus, on operation of the motor the shaft 4 is moved around the fulcrum 9 and bodily displacement of the body 8 within the container 7 in a circular path is effected, the viscosity of the liquid in the container being indicated by the instrument 21.

A bellows cap 10 within the container has a cylindrical co-axial bellows portion 11 surrounding the projection 6 and a rim flange 12 at its outer end secured by a sealing connection to the wall of the container 7. The closed end 13 of the cap 10 has centrally therein an opening 14 through which the shaft 4 passes. The end 13 is in sealing connection at 15 with the shaft 4 and lies closely adjacent to the shaft's fulcrum 9, so that the container is sealed by the cap 10 and the movement of the shaft causes a minimum of fatigue of the bellows 11.

To avoid corrosion, the cap 10 and the other parts within the container 7 may be of stainless steel or of other suitable materials.

The moving body may be surrounded, if desired, by a cylinder arranged co-axially with the bellows, as indicated at 16, and the drag on the gyrating body will then vary with the clearance between the moving surface of the body 8 and the inner face of cylinder 16, in a manner somewhat similar to that in a concentric cylinder viscometer, for example, of the Couette type.

It will be understood that the container may take any of various forms, for example, it may be a tank reservoir, vat, or pipe.

We claim:

1. A device for measuring viscosity comprising a drag member movable in a resistant liquid in a container, a fulcrum on a wall of the container and engaged by the drag member, driving means for moving the drag member relatively to the fulcrum to cause bodily movement of the drag member within the container, a flexible cover extending between the drag member and the wall to seal the fulcrum against the resistant liquid while permitting said movement of the drag member, and measuring means operable by the driving means to measure viscosity.

2. A viscometer comprising a drag member movable in a resistant liquid, in a container, a fulcrum on a wall of the container and engaged by the drag member, an electric motor connectable to a source of electric current and in driving connection with the drag member so as to move the drag member relatively to the fulcrum and cause bodily movement of the drag member within the container, a flexible cover extending between the drag member and the wall to seal the fulcrum against the resistant liquid while permitting said movement of the drag member, and measuring means operable by the current in said electric motor to measure the viscosity of the resistant liquid.

3. A viscometer comprising a drag member movable in a resistant liquid, in a container, an annular fulcrum on a wall of the container and through which extends a shaft portion of the drag member, actuating means for moving the shaft portion around the annular fulcrum to cause bodily displacement of the drag member in a continuous path within the container, a flexible cover extending between the shaft and the wall to seal the annular fulcrum against the resistant liquid in the container while permitting the shaft movement, an electric motor connectable to a source of electric current and in driving connection with the actuating means, and measuring means operable by the current in the electric motor to measure the viscosity of the resistant liquid.

4. A viscometer comprising a drag member movable in a resistant liquid in a container and including, a shaft portion, a hollow cylindrical inward projection forming a wall portion of the container, an annular fulcrum in an opening in the end wall of the projection and through which the shaft portion extends, a bellows cap enclosing the projection, the closed end of the cap lying closely adjacent to the annular fulcrum and having therein an opening through which the shaft portion extends, a sealing connection between the closed end of the cap and the shaft portion, a sealing connection between the cap rim and the container wall, actuating means for moving the shaft portion around the annular fulcrum to cause bodily displacement of the drag member in a circular path within the container, an electric motor connectable to a source of electric current and in driving connection with the actuating means, and measuring means operable by the current in the electric motor to measure the viscosity of the resistant liquid.

5. A viscometer comprising a drag member movable in a resistant liquid in a container and including, a shaft portion, a hollow cylindrical inward projection forming a wall portion of the container, an annular fulcrum in an opening in the end wall of the projection and through which the shaft portion extends, a bellows cap enclosing the projection, the closed end of the cap lying closely adjacent to the annular fulcrum and having therein an opening through which the shaft portion extends, a sealing connection between the closed end of the cap and the shaft portion, a sealing connection between the cap rim and the container wall, an electric motor connectable to a source of electric current, a crank disc fixed on the rotary shaft of the motor, an annular bearing in an opening in the disc and through which the outer end of the shaft portion extends, and measuring means operable by the current in the electric motor to measure the viscosity of the resistant liquid.

6. A viscometer as claimed in claim 5, wherein the annular fulcrum consists of an anti-friction bearing for the shaft portion.

7. A device for measuring viscosity comprising a drag member movable in a resistant liquid in a container, an annular anti-friction bearing in a wall portion of the container, a shaft portion of the drag member extending through the bearing with the axis of the shaft portion extending transversely of the bearing's axis, driving means for gyrating the shaft portion so that the ends thereof at opposite sides of the bearing define opposed conical paths with the bearing at the common apex, and a bellows seal extending between the shaft portion and the container wall to seal the bearing against the resistant liquid, and measuring means operable by the driving means to measure viscosity.

8. A viscosity measuring device according to claim 7, wherein the wall portion carrying the bearing projects within the bellows seal so that the bearing lies closely adjacent to the connection between the bellows seal and the shaft portion.

References Cited in the file of this patent

UNITED STATES PATENTS

| Number | Name | Date |
| --- | --- | --- |
| 1,695,279 | Gies | Dec. 18, 1928 |
| 2,344,331 | Swift | Mar. 14, 1944 |
| 2,369,027 | DeGiers | Feb. 6, 1945 |
| 2,454,340 | Reichel | Nov. 23, 1948 |
| 2,539,436 | Kost | Jan. 30, 1951 |

FOREIGN PATENTS

| Number | Country | Date |
| --- | --- | --- |
| 163,374 | Austria | June 25, 1949 |